(12) United States Patent
Mathur et al.

(10) Patent No.: US 9,874,740 B2
(45) Date of Patent: Jan. 23, 2018

(54) TUNABLE FILTER WITH LEVERED MEMBRANE AND LONGER SCAN LENGTH

(75) Inventors: Vaibhav Mathur, Arlington, MA (US); Peter S. Whitney, Lexington, MA (US); James W. Getz, Harvard, MA (US)

(73) Assignee: Axsun Technologies, Inc., Billerica, MA (US)

( * ) Notice: Subject to any disclaimer, the term of this patent is extended or adjusted under 35 U.S.C. 154(b) by 198 days.

(21) Appl. No.: 13/481,340

(22) Filed: May 25, 2012

(65) Prior Publication Data

US 2013/0314794 A1     Nov. 28, 2013

(51) Int. Cl.
*G02B 27/00*     (2006.01)
*G02B 26/00*     (2006.01)

(52) U.S. Cl.
CPC .................. *G02B 26/001* (2013.01)

(58) Field of Classification Search
CPC ...... G02B 26/001; G02B 26/00; G02B 26/02; G02B 26/0825; G02B 26/0841; G02B 26/08; G02B 26/0816; G02B 26/0833; G02B 5/28; G02B 26/06; G02B 26/0808; G02B 17/004; G02B 17/023; G02B 17/0615
USPC ....... 359/577, 578, 291, 846, 847, 290, 223, 359/224, 900, 199.2, 200.6, 223.1
See application file for complete search history.

(56) References Cited

U.S. PATENT DOCUMENTS

| | | | |
|---|---|---|---|
| 6,525,880 B2 | 2/2003 | Flanders et al. | |
| 6,538,798 B2 | 3/2003 | Miller et al. | |
| 6,608,711 B2 | 8/2003 | Flanders et al. | |
| 6,707,593 B2 | 3/2004 | Le et al. | |
| 6,810,062 B2 | 10/2004 | Kuznetsov | |
| 6,836,366 B1 | 12/2004 | Flanders et al. | |
| 7,416,674 B2 | 8/2008 | Coppeta | |
| 2001/0028503 A1* | 10/2001 | Flanders et al. | 359/578 |
| 2002/0071170 A1* | 6/2002 | Miller et al. | 359/291 |
| 2002/0126726 A1* | 9/2002 | Flanders | G02B 5/1828 372/107 |

\* cited by examiner

*Primary Examiner* — Thomas K Pham
*Assistant Examiner* — Sharrief Broome
(74) *Attorney, Agent, or Firm* — HoustonHogle LLP (57) ABSTRACT

A Fabry-Perot tunable filter comprises a membrane device. The membrane device includes a support structure having an optical port. Also, the membrane device has an optical membrane structure separated from the support structure over the optical port. The optical membrane structure includes a center body portion and an outer body portion. Tethers extend radially from the center body portion to the outer body portion of the optical membrane structure. The center body portion has an area that is about equal or smaller than the area of the optical port.

25 Claims, 9 Drawing Sheets

TUNABLE FILTER WITH LEVERED MEMBRANE AND LONGER SCAN LENGTH

BACKGROUND OF THE INVENTION

MEMS or Micro Electro Mechanical Systems have become useful in a variety of fields. These MEMS have been applied to such technologies as inkjet printers, accelerometers, microphones, optical and electrical switching, and fluid acceleration. Over the last decade, there has been a focus towards the development of a subclass of these devices, termed Micro-Opto-Electro-Mechanical Systems (MOEMS).

One type of MOEMS device is an electrostatically deflectable membrane. Such MOEMS membranes are used in a variety of optical applications. For example, they can be coated to be reflective and then paired with a stationary mirror to form a tunable Fabry-Perot (FP) cavity/filter. They can also be used as stand-alone reflective components to define the end of a laser cavity, for example.

Typically, a voltage is applied between the membrane and an adjacent structure. When paired with a second fixed reflector, the FP cavity's separation distance changes through electrostatic attraction as a function of the applied voltage.

There are a few main components that typically makeup a MOEMS membrane device. In one example, the MOEMS membrane device includes a handle wafer support structure. An optical membrane layer is added to the handle wafer support structure; a deflectable membrane structure is then fabricated in this layer. This MOEMS membrane device includes an insulating layer separating the wafer support structure from the membrane layer. This insulating layer is partially etched away or otherwise removed to produce the suspended membrane structure in a release process. The insulating layer thickness defines an electrical cavity across which electrical fields are established that are used to electrostatically deflect the membrane structure.

One major problem with the many MOEMS membrane devices is "pull-in" instability. Pull-in voltage is understood as the voltage that results in an electrostatic force that causes a membrane structure to be pulled against a nearby surface. The instability arises when a membrane structure moves inward and the electrostatic forces overtake the mechanical restoring forces of the membrane structure. This can cause the membrane structure to snap-down uncontrollably into an adjacent surface such as the wafer support structure and sometimes even adhere to it through a process of stiction adhesion. Stiction is a strong attraction force that causes the adhesion of two elements to one another to the point of being almost unbreakable and results from Van der Waals forces, among others.

This problem can be especially intractable in the context of optical membrane structures of MOEMS devices. This is because anti-stiction coatings are typically incompatible with the required optical coatings, such as antireflective (AR) coatings or dielectric highly reflecting (HR) coatings, for example. Moreover, MOEMS membrane structures are typically especially smooth to maximize optical performance. The smoothness of the membrane typically increases the level of stiction forces in the event of contact.

There have been MOEMS membrane device designs that have tried to combat stiction adhesion. In one example, a MOEMS membrane device includes stiction plugs formed into the membrane structure and arranged so that the plugs project towards the adjacent support structure. Therefore, if the membrane comes in contact with the adjacent support structure, the stiction plugs first contact the adjacent surfaces preventing stiction adhesion of the membrane structure to the support structure.

SUMMARY OF THE INVENTION

The rule of thumb for electrostatic cavities is that the membrane structure should not be deflected greater than one-third the size of the electrostatic cavity to avoid snap-down. This limits the structure's tuning range. This problem can be addressed to some degree by increasing the size of the electrostatic cavity. However, a larger cavity by itself results in higher drive voltages. Thus, there is a need for a membrane design that allows for the membrane structure to move further downward while avoiding snap-down and higher drive voltages.

Also, there is a need for a much lower curvature sensitivity or variation of the membrane structure. Curvature sensitivity relates to the sensitivity of the membrane structure to external forces. For example, a membrane structure with high curvature sensitivity will easily become cupped in shape when forces pull on it inwards. Furthermore, a membrane structure with highly stressed coatings, for example, will bend into a concave or convex shape drastically affecting the device performance. Thus, it is desirable for the curvature sensitivity to be lowered so that the membrane structure can maintain a more flat surface.

In general, according to one aspect, the invention features a Fabry-Perot tunable filter comprising a membrane device. The membrane device includes a support structure having an optical port. Also, the membrane device has an optical membrane structure separated from the support structure over the optical port. The optical membrane structure includes a center body portion and an outer body portion. Tethers extend radially from the center body portion to the outer body portion of the optical membrane structure. The center body portion has an area that is about equal or smaller than the area of the optical port.

In embodiments, the optical port opening has a diameter between about 290 micrometers to about 400 micrometers and the center body portion has a diameter between about 300 micrometers to about 600 micrometers. Further, the optical membrane structure center body portion includes a membrane mirror that has a diameter between about 200 micrometers to about 250 micrometers.

Currently, the tethers form a spiral pattern around the center body portion of the optical membrane structure. An electrostatic driver is used to provide a voltage between the optical membrane structure and the support structure. This results in the deflection of the center body portion by a distance greater than ⅓ the distance to the support structure when driven by the electrostatic forces. Preferably, the center body portion deflects by about 50% the distance to the support structure, due to a levering effect since the electrostatic forces mainly work on the tethers and not the center body portion.

In the current embodiment, the insulating layer and thus the electrostatic cavity is between about 3 micrometers and about 6 micrometers in thickness.

The optical membrane structure and thus the membrane layer currently have a thickness of between about 5 micrometers and about 20 micrometers.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same or similar parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
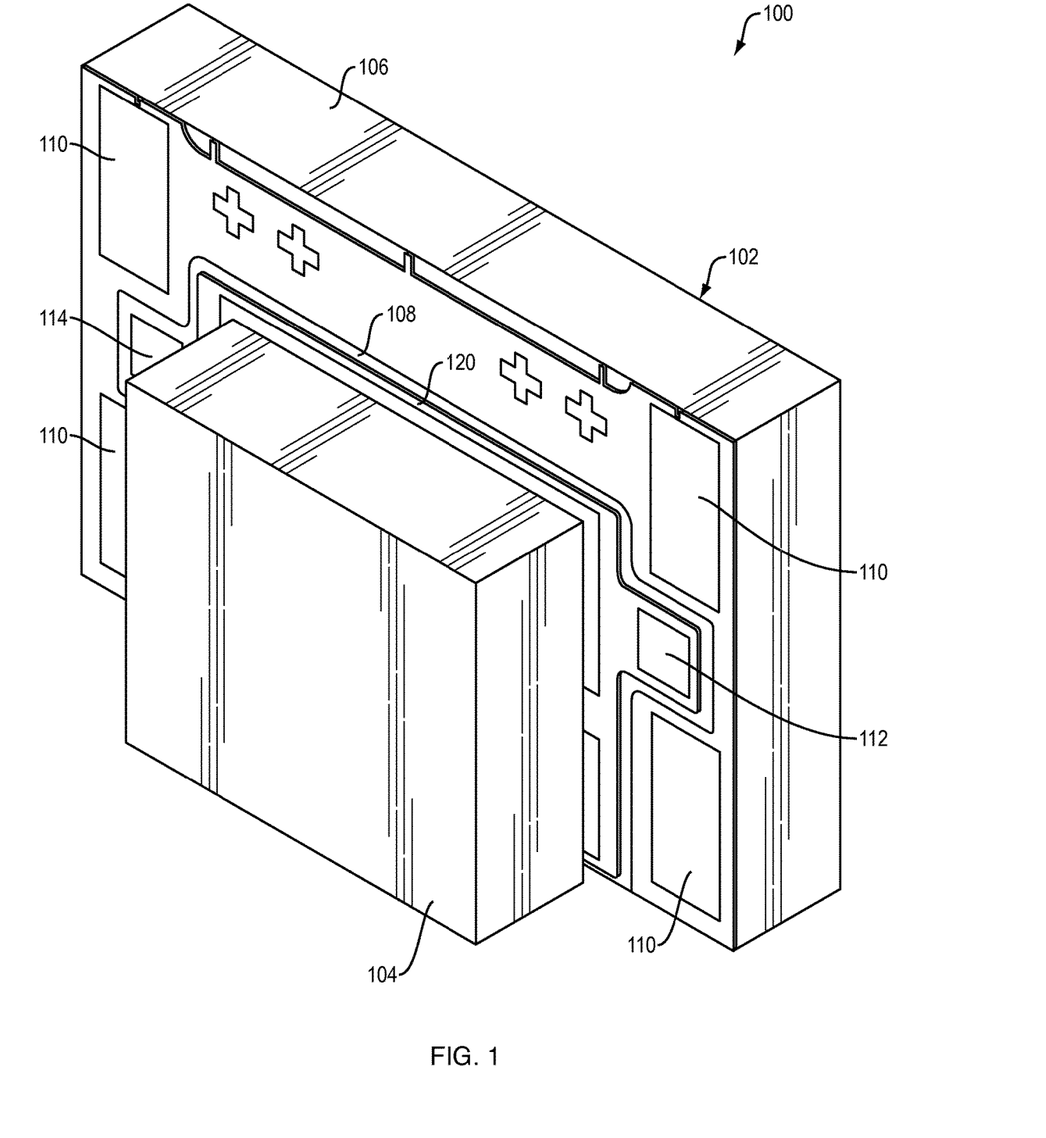
FIG. 1 is a perspective view of a Fabry-Perot (FP) tunable filter comprising a mirror spacer bonded to an optical membrane device, according to an embodiment of the invention.

FIG. 1 shows a MEMS Fabry-Perot (FP) tunable filter 100 that has been constructed according to the principles of the present invention.

The FP tunable filter 100 comprises a mirror spacer 104 coupled to an optical membrane device 102 forming one unit.

The membrane device 102 includes a support structure 106. The support structure 106 functions as a base for the other components of the membrane device 102.

In one example, the support structure 106 can be made from a wafer material or more specifically a handle wafer material. The handle wafer material is from a silicon wafer that is singulated to form the support structure in FIG. 1.

The membrane device 102 further includes an insulating layer 108. The insulating layer 108 is positioned over the support structure 106. A membrane layer 120 is provided on the insulating layer 108. The insulating layer 108 functions as a sacrificial/release layer for the membrane structure that is formed in the membrane layer 120. In one example, the insulating layer is between about 3 and 6 micrometers in thickness.

In this example, there are four metal pads 110 positioned at each corner of the membrane device 102. These metal pads 110 are useful for installing the filter 100 on a micro-optical bench or clip or LIGA structures, for example.

Also, there are two wire metal bond pads 112/114 further provided on the front of the membrane device 102 and positioned vertically between two of the metal pads 110 on opposite lateral sides of the membrane device 102. Membrane layer wire bond pad 112 provides electrical access for electrical control of the membrane layer 120. The other wire bond pad is a support structure bond pad 114 that provides electrical access to the support structure 106.

Figure 2:
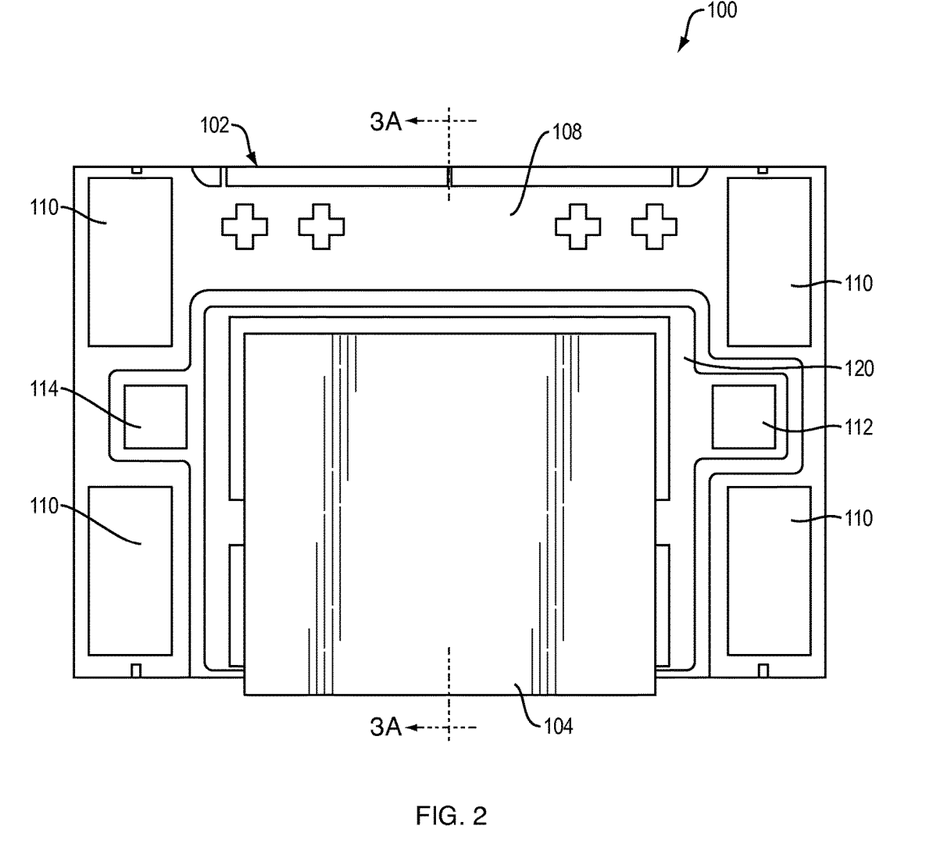
FIG. 2 is a front plan view of the FP tunable filter shown in FIG. 1.

FIG. 2 is a front view of the tunable filter 100 shown in FIG. 1. The spacer 104 fits and attaches directly into a middle section of the membrane device 102 to form a unit that can be used as a FP tunable filter 100.

Figure 3A:
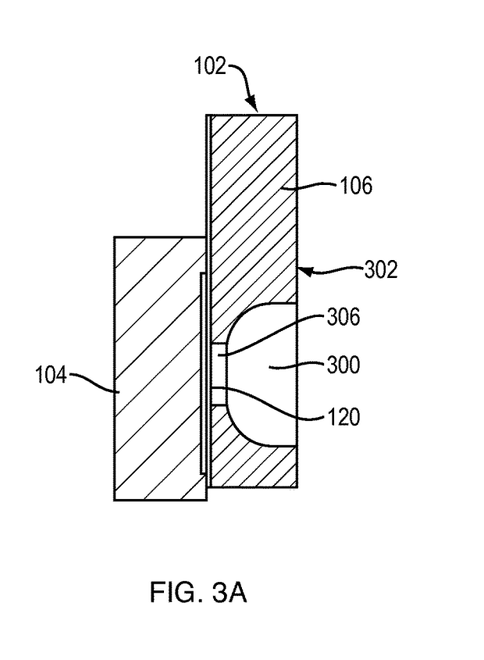
FIGS. 3A-3B are cross-sectional views along cross-section A-A of FIG. 2 of the FP tunable filter with and without the mirror spacer, respectively, according to an embodiment of the invention.
Figure 3B:
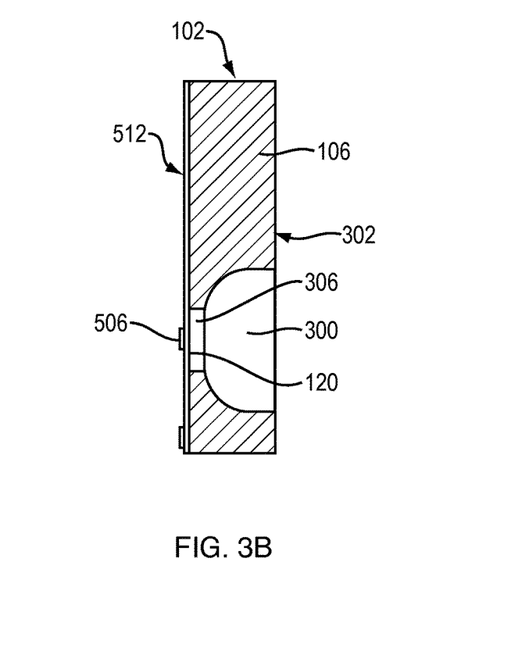

In FIGS. 3A-3B, the cross-section of the FP tunable filter 100 is viewed along line A-A of FIG. 2 with and without the spacer 104. An optical port 300 is shown along the cross-section within the membrane device 102. The optical port 300 extends entirely through from the distal side 302 of the support structure 106 to expose the backside of the membrane layer 120.

FIG. 3A shows the optical membrane device 102 with the mirror spacer 104 attached. The mirror spacer 104 is attached or bonded directly over the optical port opening 306.

FIG. 3B shows the optical membrane device 102 without the mirror spacer. The solder bond pads 512 enable attachment of the mirror spacer 104 to the optical membrane device 102. A highly reflecting mirror 506 is deposited on the center of the membrane structure.

Figure 4:
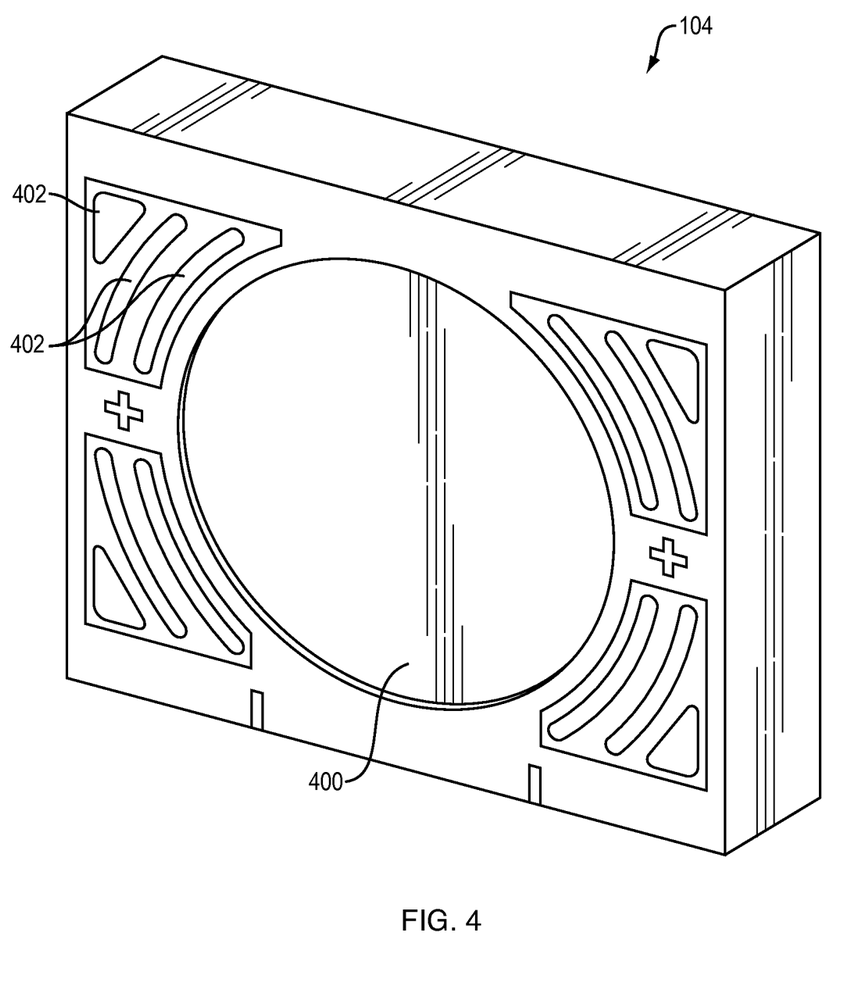
FIG. 4 is a perspective view of the mirror spacer according to an embodiment of the invention.

FIG. 4 is a front view of the mirror spacer 104. A circular mirror 400 is recessed into the center of the mirror spacer 104. The mirror 400 is formed by depositing a high reflectivity (HR) coating such as a dielectric mirror coating or reflective metal coating in the recess. When attached to the membrane device 102, the mirror spacer 104 functions to separate the mirror 400 from the membrane structure to thereby define a FP cavity. The mirror spacer 104 also includes pre-deposited solder pads 402 set at each corner of the mirror spacer 104 surrounding the mirror 400. The pre-deposited solder 402 allows for the mirror spacer 104 to be bonded onto the metal or solder pads 512 of the membrane device 102.

Figure 5A:
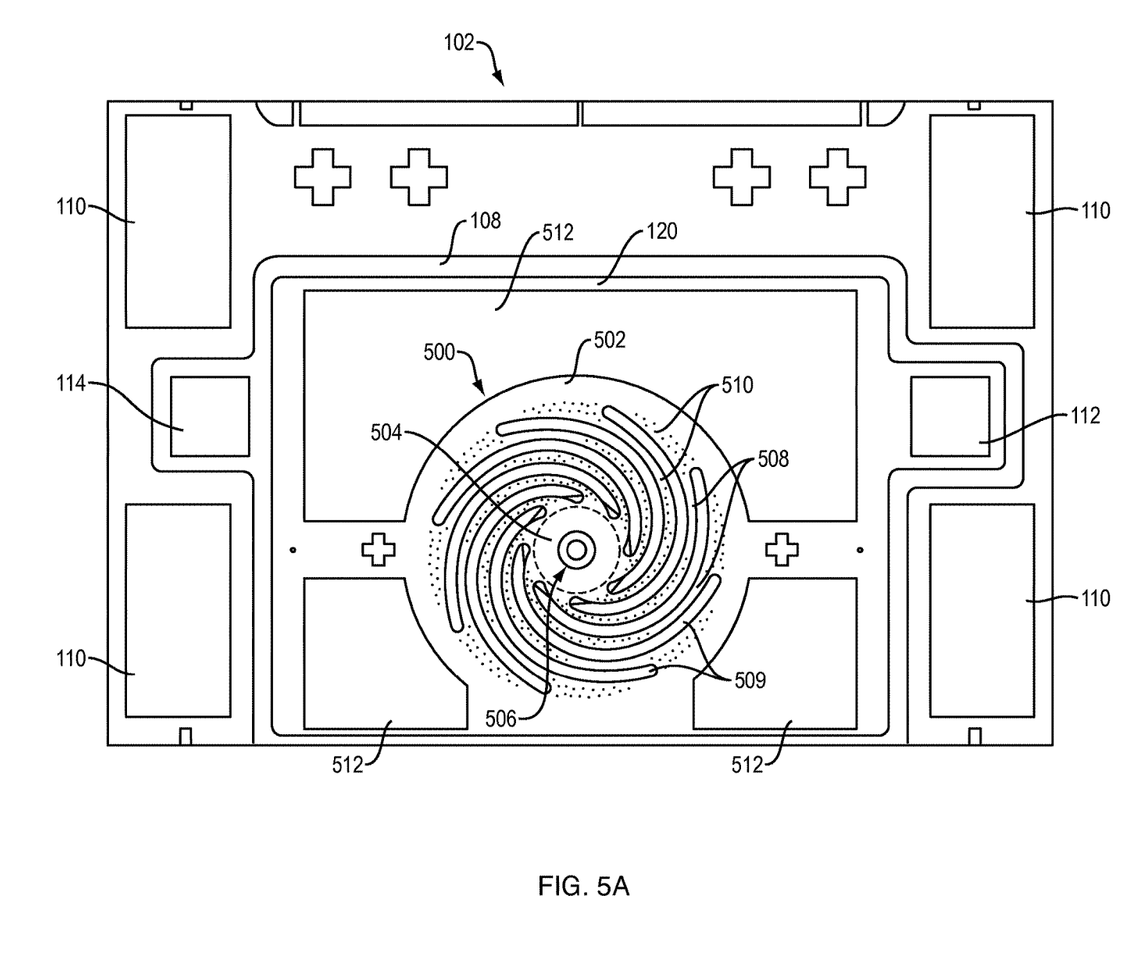
FIG. 5A is a front view of the optical membrane device according to an embodiment of the invention.
Figure 5B:
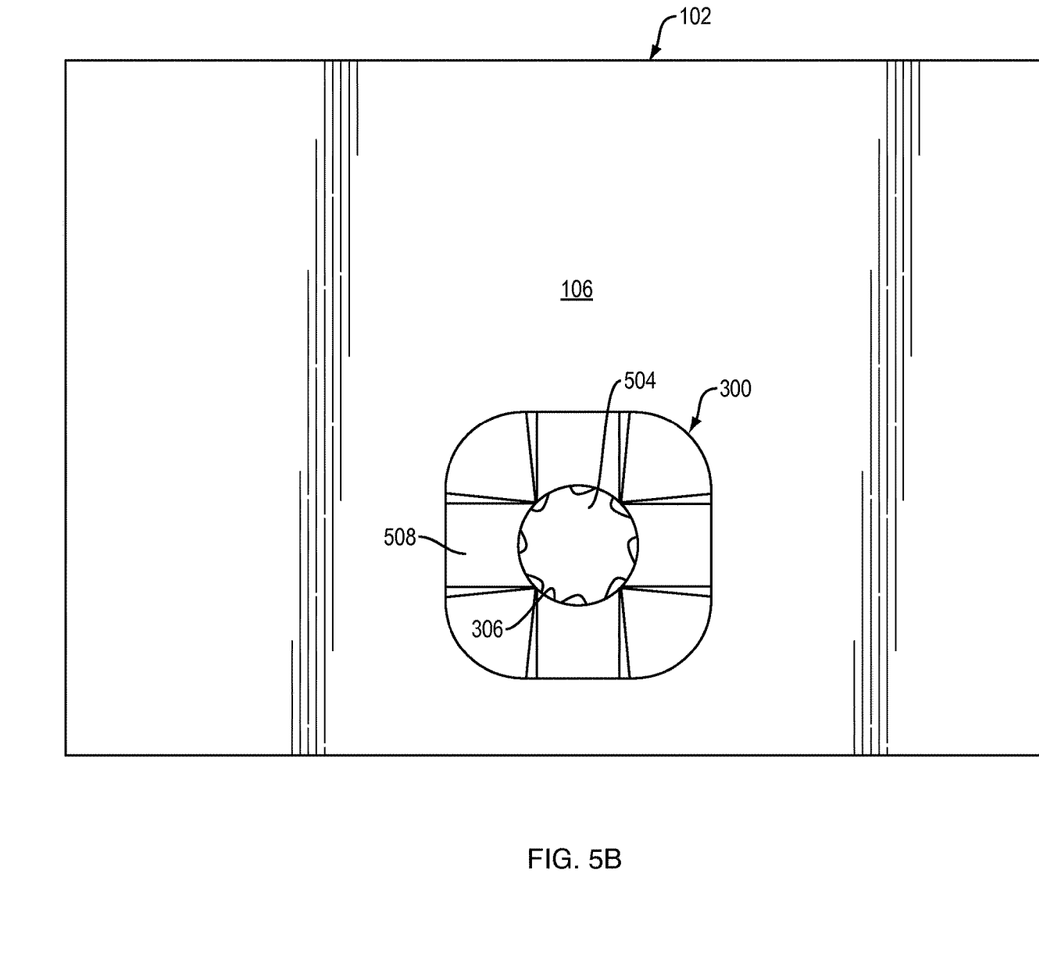
FIG. 5B is a rear view showing the back-side of the optical membrane device and the optical port according to an embodiment of the invention.

FIGS. 5A and 5B are front and back views of the optical membrane device 102.

FIG. 5A is a front view of the optical membrane device 102 without the mirror spacer 104.

As described above, the mirror spacer 104 is attached to the front of the optical membrane device 102. More specifically, the mirror spacer 104 is attached onto the membrane device 102 so that the mirror 400 is affixed over an optical membrane structure 500 using metal pads 512.

The optical membrane structure 500 is fabricated in the optical membrane layer 120 that was formed on or attached to the insulating layer 108. In one example, the optical membrane structure 500 has an overall circular shape formed within the membrane layer 120.

The optical membrane structure 500 can be made from silicon. For example, the optical membrane layer can be manufactured from a silicon wafer that has been bonded to the insulating layer 108 under elevated heat and pressure. Other alternatives are, however, silicon nitride, polycrystalline silicon, or essentially single crystal silicon, which have been deposited on the insulating layer 108.

The optical membrane structure 500 is layered or installed on the sacrificial insulating layer 108. The insulating layer 108 functions as a sacrificial/release layer, which is partially removed to release the optical membrane structure 500 from the support structure 106.

In one example, the optical membrane structure 500 is about 5 to 20 micrometers in thickness or more preferably about 5 to 10 micrometers in thickness. Such thickness range provides adequate structural integrally while not making the structure overly rigid or brittle.

The optical membrane structure 500 includes an outer body portion 502 and a center body portion 504. The outer body portion 502 is an outer edge of the optical membrane structure 500. The center body portion 504 is the central section of the optical membrane structure 500 that is supported over the optical port 300. In one example, the center body potion 504 is between about 300 and 600 micrometers in diameter.

The center body portion 504 includes a membrane mirror 506. The membrane mirror 506 is directly in the middle of the optical membrane structure 500. The membrane mirror 506 has a diameter between about 200 micrometers to about 250 micrometers. Also, in one example, the membrane mirror 506 is made from a dielectric mirror coating that is deposited on the membrane layer 120.

The optical membrane structure 500 includes tethers 508 that extend radially from the outer body portion 502 to the center body portion 504 in a spiral pattern such that each tether extends through greater than a 90 degree arc. In the illustrated example, there are 8 tethers 508. In general, the number of tethers is typically between 4 and 20. The outer body portion 502 forms a ring where the tethers 508 terminate. The tethers 508 are defined by cuts 509 or slots formed around the center body portion 504 within the optical membrane layer 120.

The tethers 508 include holes 510 scattered across each tether 508 from the outer body portion 502 to the center body portion 504. These holes 510 are etchant holes that allow etchant to pass through the optical membrane structure 500 to assist in the removal of the insulating layer 108 during the release process.

Also, FIG. 5A shows the three metal bond pads 512 positioned around the optical membrane structure 500. These metal bond pads 512 are deposited on the proximal side of the optical membrane structure 500. The metal bond pads 512 are used to solder bond, for example, the mirror spacer 104 to the optical membrane device 102. In an alternative example, the mirror spacer 104 can be integral with the optical membrane device 102.

FIG. 5B is a backside view of the optical membrane device 102. An optical port 300 is formed through the support structure 106 of the optical membrane device 102. This is for enabling optical access to the optical membrane structure 500 from the bottom or backside of the optical membrane device 102. As a result, looking through the backside of the optical membrane device 102, the center body portion 504 and tethers 508 of the optical membrane structure 500 can be observed.

In one example, the optical port 300 has inward sloping sidewalls 508 that end in the port opening 306. In a further example, the optical port opening 306 has a diameter between about 290 micrometers to about 400 micrometers.

Figure 6:
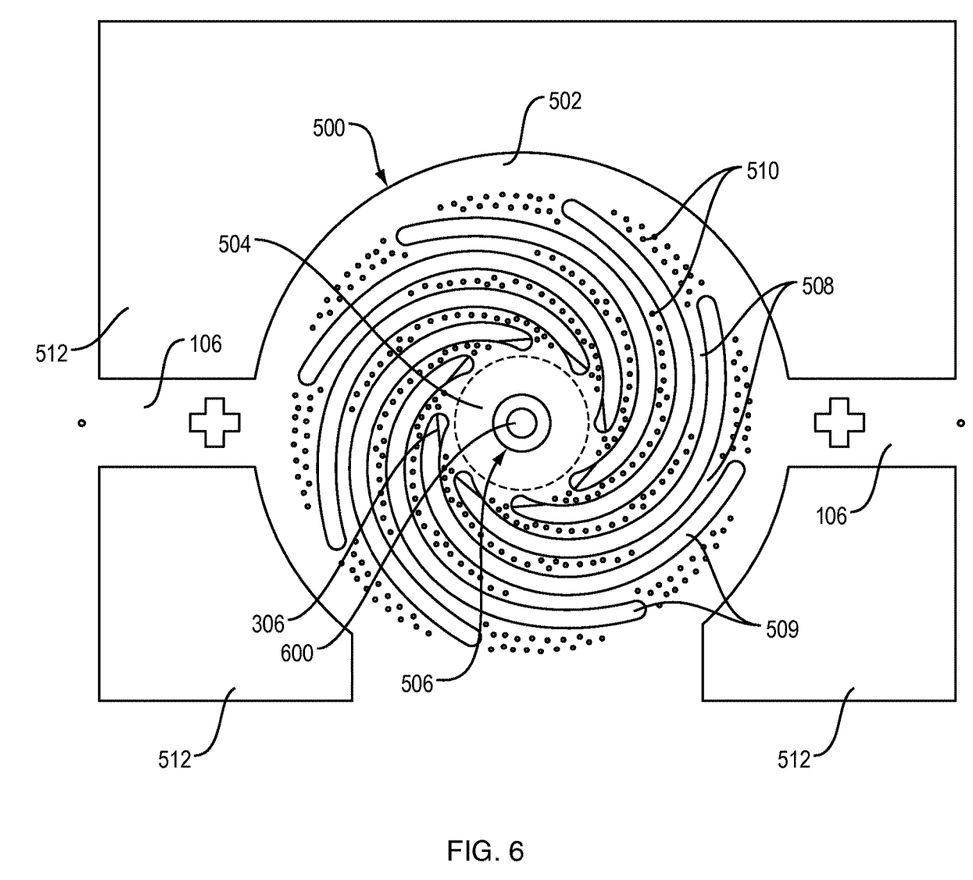
FIG. 6 is a partial front view showing the details of the optical membrane structure according to an embodiment of the invention.

FIG. 6 is a zoomed-in front view of the optical membrane structure 500.

The optical membrane structure 500 is supported over the optical port 300 with support from the support structure 106 and insulating layer 108 of the optical membrane structure 500.

As discussed above, the optical membrane structure 500 includes tethers 508 extending from the outer body portion 502 to the center body portion 504 of the optical membrane structure 500. In one example, the tethers 508 form a spiral pattern around the center body portion 504. In another example, the tethers can have a length of about 470 micrometers. Also, the tethers can have a thickness between about 5 to 20 micrometers or more preferably about 5 to 10 micrometers in thickness.

The area or diameter of the center body portion 504 is about equal or smaller than the area of the optical port opening 306. In general, the diameter of the center body portion 504 is about 120% of the diameter of the optical port opening 306 or less. Preferably, the center body portion 504 has a diameter that is less than the optical port opening 306. In the FIG. 6 example, the center body portion 504 is smaller in diameter than that of the optical port opening 306 by 10% or more. This relationship is important for allowing the center body portion 504 to increase its downward deflection distance with respect to the optical port 300 while still combating pull-in instability forces. In the current embodiment, the center body 504 is capable of deflecting more than a ⅓ of the electrostatic gap, up to 50% of the electrostatic gap or more because of a levering effect.

In one embodiment, the membrane mirror 506 has an optically curved surface 600. This optical surface 600 is formed centrally on the membrane mirror 506. In one example, the surface 600 is fabricated as described in U.S. Pat. No. 7,416,674. The curvature of the surface is designed as described in U.S. Pat. No. 6,810,062 in order to suppress higher order modes within the filter cavity. In another example, the area of the membrane mirror 506 is between about 39% to about 48% of the area of the optical port opening 306.

In the implementation as a Fabry-Perot filter or other reflecting membrane, the optical coating dot 506 is preferably a highly reflecting (HR) dielectric mirror stack. This yields a highly reflecting, but low absorption, structure that is desirable in, for example, the manufacture of high finesse Fabry-Perot filters.

Figure 7:
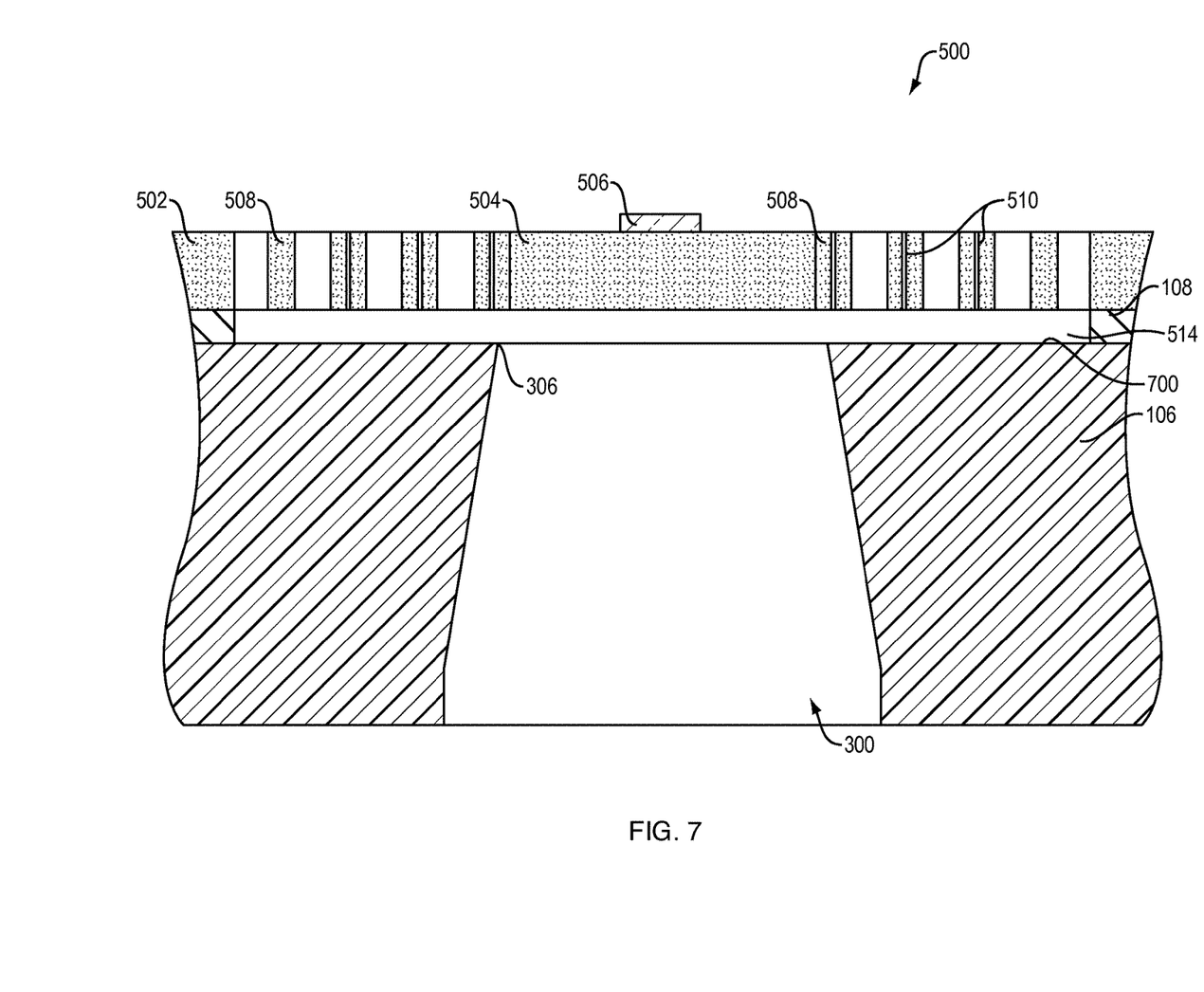
FIG. 7 is a schematic cross-section view of the optical membrane device according to an embodiment of the invention.

FIG. 7 is a schematic cross-section of the optical membrane structure 500 supported above the optical port opening 306.

The optical port 300 is formed through the support structure 106. As described above, the walls of the optical port 300 slope inward and terminate at the optical port opening 306 to define the extent of an electrostatic cavity in region 514. This electrostatic cavity region 514 was formed by the removal of the insulating layer 108.

The support structure 106 supports the remaining insulating layer 108 surrounding the optical port 300. The outer body portion 502 of the membrane layer 120 is configured over the insulating layer 108.

An external electrostatic driver provides a voltage between the optical membrane structure 500 and the support structure 106. This causes the center body portion 504 to move downwards towards the port opening 700 of the optical port 300. Thus, the size of the FP cavity can be modulated by establishing an electrostatic drive voltage.

As shown in FIG. 7, the spiral tethers 508 extend from the outer body portion 502 to the center body portion 504 close to where the optical port opening 306 begins. The center body 504 is supported by the tethers 508 over the optical port opening 306. As the center body 504 moves downwards into the port opening 700, the tethers 508 flex or extend to a point while still restricting the center body 504 from moving far enough down to enable pull-in instability and the consequence of stiction to occur.

Figure 8:
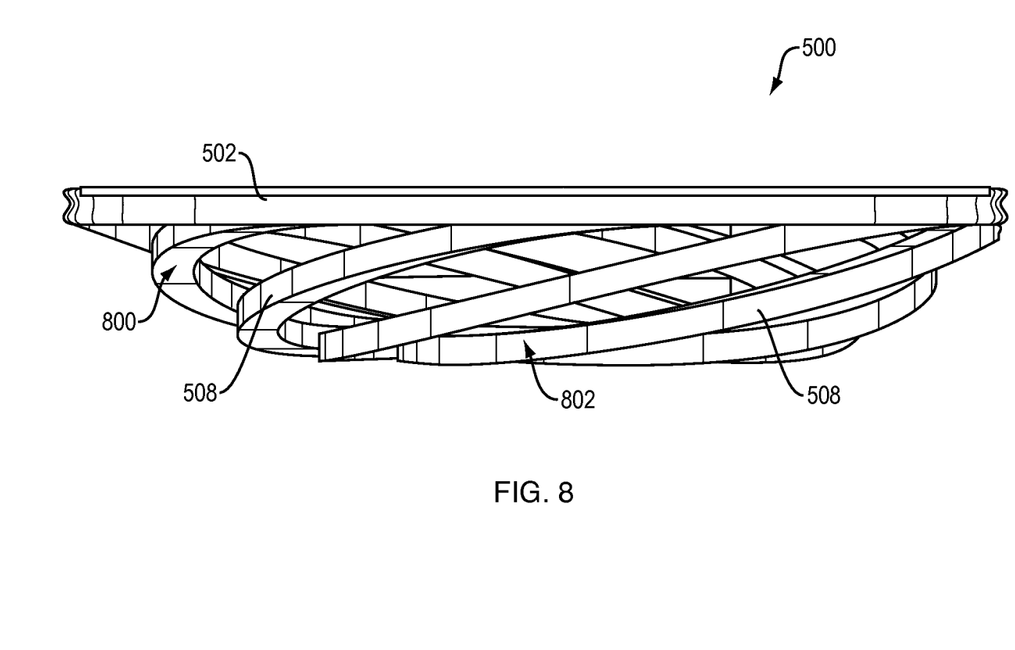
FIG. 8 is a perspective view showing the deflection of the optical membrane structure according to an embodiment of the invention.

FIG. 8 shows the deflection of the optical membrane structure 500. The deflection of an optical membrane structure 500 in terms of distance is in the range of micrometers. Thus, FIG. 8 is a magnified view with respect to actual deflection.

The optical membrane structure 500 can only be deflected across approximately one-third of the electrostatic cavity length that is defined by the thickness of the insulating layer 108. Larger deflections can result in snap down, where the optical membrane structure 500 moves in an uncontrolled fashion to contact a stationary electrostatic electrode or nearby surface.

In the present design, the electrostatic cavity 514 is located entirely or largely underneath the tethers 508. In the illustrated example, the optical port opening 306 generally circumscribes the center body portion 504 of the membrane structure 500. Therefore, the tethers on average can only deflect about one third of the size of the electrostatic cavity 514. However, the center body portion 504 can actually deflect more than this one third distance because of the lever effect. This is because the electrostatic cavity operates mainly on the tethers 508 rather than the tethers 508 and the center body portion 504. Thus, with the present design, the center body portion 504 can deflect more than would typically be associated with the electrostatic cavity.

In one example, as the center body portion 504 of the optical membrane structure 500 moves downward due to application of a voltage, the tethers 508 also move downwards to compensate for the center body portion 504 movement. The tethers 508 extend in varying degrees from the outer body portion 502 to the center body portion 504. The distal sections 800 of the tethers 508, with respect to the center body portion 504, deflect the least distance while the proximal sections 802 of the tethers 508, with respect to the center body portion 504, deflect the longest distance.

While this invention has been particularly shown and described with references to preferred embodiments thereof, it will be understood by those skilled in the art that various changes in form and details may be made therein without departing from the scope of the invention encompassed by the appended claims.

What is claimed is:

1. A Fabry-Perot tunable filter comprising:
a membrane device comprising:
a support structure having an optical port opening;
an optical membrane structure separated from the support structure over the optical port, wherein the optical membrane structure includes a center body portion, an outer body portion, and tethers extending radially from the center body portion to the outer body portion of the optical membrane structure, wherein a diameter of the center body portion is smaller than a diameter of the optical port opening with inner end portions of the tethers being visible from a backside of the optical membrane structure through the optical port;
wherein the center body portion deflects greater ⅓ the distance to the support structure when driven by electrostatic forces.

2. The Fabry-Perot tunable filter of claim 1 wherein the optical port opening has a diameter between about 290 micrometers to about 400 micrometers.

3. The Fabry-Perot tunable filter of claim 1 wherein the center body portion has a diameter between about 300 micrometers to about 600 micrometers.

4. The Fabry-Perot tunable filter of claim 1 wherein the optical membrane structure center body portion includes a membrane mirror.

5. The Fabry-Perot tunable filter of claim 4 wherein the membrane mirror has a diameter between about 200 micrometers to about 250 micrometers.

6. The Fabry-Perot tunable filter of claim 4 wherein the membrane mirror is coated with an optical coating dot.

7. The Fabry-Perot tunable filter of claim 6 wherein the optical coating dot is a highly reflecting dielectric mirror stack.

8. The Fabry-Perot tunable filter of claim 1 wherein the tethers form a spiral pattern around the center body portion of the optical membrane structure.

9. The Fabry-Perot tunable filter of claim 1, further comprising a mirror spacer attached over a front side of the membrane device.

10. The Fabry-Perot tunable filter of claim 9 wherein the mirror spacer includes a circular mirror recessed into the mirror spacer.

11. The Fabry-Perot tunable filter of claim 10 wherein the mirror is formed from a high reflectivity coating.

12. The Fabry-Perot tunable filter of claim 1, further comprising an electrostatic driver for providing a voltage between the optical membrane structure and the support structure.

13. The Fabry-Perot tunable filter of claim 1 wherein the support structure is a wafer material.

14. The Fabry-Perot tunable filter of claim 13 wherein the wafer is singulated to form the support structure.

15. The Fabry-Perot tunable filter of claim 1 wherein the tethers include holes formed along each tether.

16. The Fabry-Perot tunable filter of claim 1 wherein the optical membrane device further comprises an insulating layer separating the optical membrane structure from the support structure.

17. The Fabry-Perot tunable filter of claim 16 wherein the insulating layer is between about 3 micrometers and about 6 micrometers in thickness.

18. The Fabry-Perot tunable filter of claim 16 wherein the optical membrane device further comprises a membrane layer wire bond pad deposited on the insulating layer.

19. The Fabry-Perot tunable filter of claim 16 wherein the optical membrane device further comprises a support structure bond pad deposited on the insulating layer.

20. The Fabry-Perot tunable filter of claim 1 wherein the optical membrane structure has a thickness between about 5 micrometers and about 20 micrometers.

21. The Fabry-Perot tunable filter of claim 1 wherein the center body portion deflects more than 50% the distance to the support structure when driven by electrostatic forces.

22. A membrane device comprising:
a support structure having an optical port opening;
an optical membrane structure separated from the support structure over the optical port, wherein the optical membrane structure includes a center body portion, an outer body portion, and tethers extending radially from the center body portion to the outer body portion of the optical membrane structure, wherein the tethers are electrostatically deflected over about one-third of a distance to the support structure and the center body portion deflects by more than 50% of the distance.

23. The device as claimed in claim 22 wherein the center body portion is smaller in diameter than the optical port opening by 10% or more.

24. A Fabry-Perot tunable filter comprising:
a membrane device comprising:

a support structure having an optical port opening;
an optical membrane structure separated from the support structure over the optical port, wherein the optical membrane structure includes a center body portion, an outer body portion, and tethers extending radially from the center body portion to the outer body portion of the optical membrane structure, wherein a diameter of the center body portion is smaller than a diameter of the optical port opening with inner end portions of the tethers being visible from a backside of the optical membrane structure through the optical port;

wherein the center body portion is smaller in diameter than the optical port opening by 10% or more.

25. The device as claimed in claim 22 wherein inner end portions of the tethers are visible from a backside of the optical membrane structure through the optical port.

\* \* \* \* \*